US008760825B2

(12) United States Patent
Erger et al.

(10) Patent No.: US 8,760,825 B2
(45) Date of Patent: Jun. 24, 2014

(54) WIRELESS BRANCH CIRCUIT ENERGY MONITORING SYSTEM

(75) Inventors: Robert Erger, Swisher, IA (US); William Broghammer, Anamosa, IA (US); Brett Larson, Cedar Rapids, IA (US); Paul A. Reid, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 30 days.

(21) Appl. No.: 13/493,076

(22) Filed: Jun. 11, 2012

(65) Prior Publication Data

US 2013/0329331 A1    Dec. 12, 2013

(51) Int. Cl.
*H02H 3/00* (2006.01)

(52) U.S. Cl.
USPC .................................................. 361/42; 361/62

(58) Field of Classification Search
USPC .......................................................... 361/42, 62
See application file for complete search history.

(56) References Cited

U.S. PATENT DOCUMENTS

| | | | |
|---|---|---|---|
| 6,798,209 B2 | 9/2004 | Lavoie et al. | |
| 6,847,297 B2 * | 1/2005 | Lavoie et al. | 340/540 |
| 6,868,349 B2 | 3/2005 | Fletcher et al. | |
| 7,403,015 B2 | 7/2008 | Carlino et al. | |
| 7,417,554 B2 | 8/2008 | Benke et al. | |
| 7,436,641 B2 | 10/2008 | Holley | |
| 7,579,963 B2 | 8/2009 | Viaro et al. | |
| 8,018,097 B2 | 9/2011 | Saito et al. | |
| 2006/0176630 A1 * | 8/2006 | Carlino et al. | 361/64 |
| 2006/0271314 A1 | 11/2006 | Hayes | |
| 2012/0123762 A1 | 5/2012 | Studer et al. | |
| 2013/0054162 A1 * | 2/2013 | Smith et al. | 702/59 |

FOREIGN PATENT DOCUMENTS

| | | |
|---|---|---|
| WO | WO2010119332 | 10/2010 |
| WO | WO2012054337 | 4/2012 |

OTHER PUBLICATIONS

International Search Report for International Application No. PCT/US2013/044712 mailed Sep. 27, 2013.

* cited by examiner

*Primary Examiner* — Danny Nguyen
(74) *Attorney, Agent, or Firm* — Locke Lord LLP (57) ABSTRACT

A circuit breaker (such as a miniature circuit breaker) that wirelessly communicates state and fault information to a main energy monitoring module. The wireless circuit breaker includes a transceiver and a power supply that harvests energy inductively from the line current conductor without the need for a connection to a neutral conductor. The wireless circuit breaker can be implemented in the same package as existing circuit breakers, eliminating the need to replace the panel when upgrading to a system that employs a main energy monitoring module. The wireless circuit breaker can also include an energy storage device for supplying power to the circuit breaker after it has tripped, allowing the circuit breaker to transmit information after a trip. The main energy monitoring module includes a processor and a gateway for evaluating and transmitting information received from the circuit breaker to other applications, such as webpages and smartphones.

18 Claims, 4 Drawing Sheets

WIRELESS BRANCH CIRCUIT ENERGY MONITORING SYSTEM

FIELD OF THE INVENTION

The invention relates to circuit breakers, and more particularly to wireless circuit breakers.

BACKGROUND OF THE INVENTION

Circuit breakers provide protection in electrical systems by monitoring characteristics of the electrical power supplied to loads over electrical conductors and interrupting or breaking the circuits (tripping) when fault conditions (e.g., arc faults, ground faults, and unsafe "over current" levels) are detected. Circuit breakers are typically installed in circuit breaker panels, or load centers, often in utility rooms for commercial applications and basements for residential applications.

Many existing circuit breaker panel installations provide only limited information to electricians and consumers about the nature of the fault conditions observed by the circuit breakers. For example, a residential consumer may only be able to determine that a circuit breaker has tripped, without knowing why. More sophisticated circuit breakers include circuitry for detecting arc faults and ground faults. Ground faults may occur when the electric current is not balanced between an energized line conductor and a neutral conductor, for example when the current is being grounded through a person accidentally touching the circuit. Arc faults occur with dangerous arcing due to defective or damaged wiring, switches, etc. Circuit breakers designed to detect ground faults and arc faults may include circuitry for monitoring the line current of the branch to which the circuit breaker is connected and a controller for processing the data sensed from the line current. The controller may also include memory for storing such data. However, this data is typically only used by the circuit breaker in making a decision to trip. Once again, a consumer or electrician can determine that a circuit breaker has tripped, but has no visibility into the conditions that caused the trip.

This data, if it were accessible outside the circuit breaker, could be valuable for monitoring the individual branch over time, and also in conjunction with similar data from other circuit breakers in the system useful for monitoring the system as a whole. For example, electrical usage on individual branches could be tracked, faulty wiring could be identified prior to a circuit tripping, etc. As smart grid technology becomes more prevalent, it is becoming more desirable to extract as much information as possible from circuit breakers.

However, it is difficult and expensive to retrofit an existing electrical system with circuitry capable of monitoring and aggregating the data from a plurality of circuit breakers. For example, it may be necessary to modify existing circuit breakers with additional circuitry and external wired connections to gather and make branch circuit state information available and accessible. Circuit breaker panels would then need to be retrofitted with additional circuitry to interface with the additional wired connections of the modified circuit breakers. The additional labor necessary to install the additional circuitry, which would typically be performed by an electrician or engineer, can be involved and expensive. In such cases, it may be more cost effective to add an entirely new circuit breaker panel with new circuit breakers instead of retrofitting existing equipment.

Moreover, space in circuit breaker panels is often at a premium. As consumer demand for electronics increases, existing electric systems must accommodate greater electrical usage. Miniature Circuit Breakers ("MCB") have been introduced to maximize the space in circuit breaker panels. MCBs are now commonly used for residential circuit breakers and include a substantial installed base. Adding functionality to MCBs is desirable because of the opportunity to take advantage of the large installed base. However, retrofitting MCBs is made more complicated because these packages are already space-constrained. Because of the limited space in the panel, it is often not practical to retrofit an existing circuit breaker by augmenting it with components and wiring outside of the circuit breaker housing and within the panel. For example, there may be insufficient room in the branch circuit wiring space of a panel to accommodate components such as current transformers and associated wiring. This is made more challenging and expensive because components outside of a circuit breaker package are exposed to damage and must be protected with some form of housing, which adds to materials cost and the space the additional components consume. Thus, designers are faced with a dilemma in which space constraints in the circuit breaker panel make it disadvantageous to increase the size of or augment existing circuit breakers, yet the small size of circuit breakers makes it difficult to increase their functionality within the existing packages of circuit breakers themselves.

SUMMARY OF THE INVENTION

The present disclosure provides for circuit breakers that wirelessly communicate state and fault information to a main energy monitoring module. In one embodiment, a wireless transceiver is integrated inside the housing of a circuit breaker, coupled to a controller in the circuit breaker. The wireless circuit breaker includes a power supply that harvests energy inductively from the line current conductor through the use of a current transformer surrounding the conductor, without the need for a connection to a neutral conductor.

Accordingly, the wireless circuit breaker can be implemented using the same package dimensions as existing circuit breakers, allowing the wireless circuit breaker to be a drop-in replacement in an existing panel. In particular, the wireless functionality and power supply can be implemented within the existing package size of a residential MCB, and thus can serve as a drop-in replacement for an existing MCB in an installed base. This eliminates the need to replace the panel when upgrading to a system that employs a main energy monitoring module. It also minimizes any additional materials and labor necessary to install the wireless circuit breakers as compared to existing circuit breakers.

According to another aspect of the disclosure, the wireless circuit breaker includes an energy storage device, such as a capacitor or battery, for supplying power to the circuit breaker after it has tripped. This allows the circuit breaker to wirelessly transmit the existence of the trip, along with information about the conditions that caused the trip, to the main energy monitoring module after the trip occurs.

The main energy monitoring module includes a processor for evaluating the information from one or more branch circuits received wirelessly from the wireless circuit breakers. The main energy monitoring module includes a gateway for interfacing with other applications, such as webpages and smartphones. Valuable information including the existence and circumstances of a trip can be collected and sent directly to a customer or electrician through the webpages and smartphones.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Figure 1:
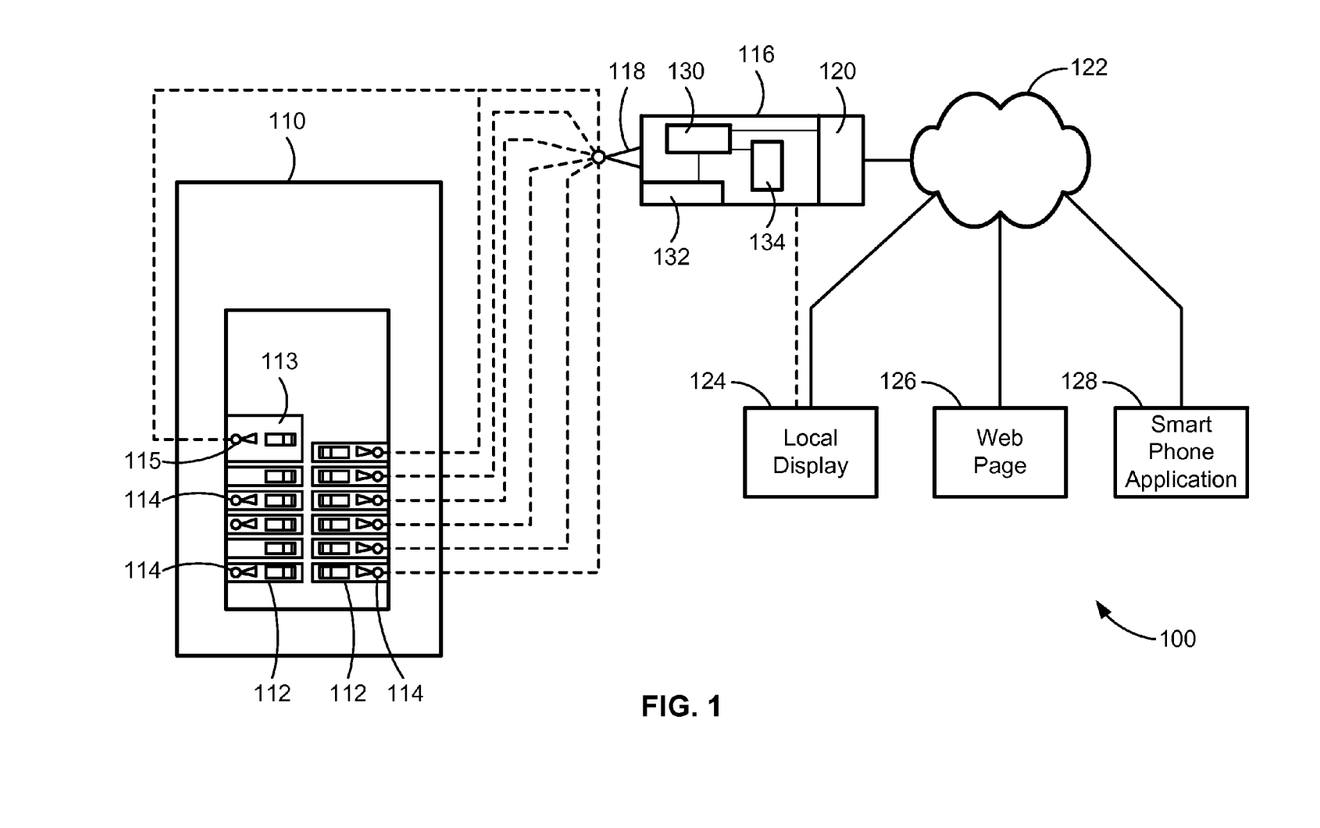
FIG. 1 is a block diagram of a circuit breaker monitoring system in accordance with an aspect of the disclosure.

FIG. 1 shows a block diagram of a circuit breaker monitoring system 100. The circuit breaker monitoring system 100 includes a circuit breaker panel 110 with a plurality of circuit breakers 112. Each circuit breaker 112 includes a radio transmitter/receiver ("transceiver") 114 for transmitting and receiving wireless data. The panel 110 may be an existing panel in which one or more existing circuit breakers has been replaced with the wireless circuit breakers 112.

The circuit breaker monitoring system 100 also includes a main energy monitoring module ("main module") 116 remote from the circuit breaker panel 110. The main module 116 includes a radio transceiver 118 for receiving data transmitted by the radio transceivers 114 of the circuit breakers 112. It also includes a CPU (e.g., a microprocessor, controller, etc.) 130 coupled to the transceiver 118 for processing information received from the circuit breakers 112. The main module 116 may integrated with the panel 110 or physically separated by a distance permitted by the transmission protocol and power of the radio transceivers 114.

Each of the circuit breakers 112 shown is a single-pole circuit breaker that measures characteristics of the current (e.g., the magnitude of the current in Amperes) on a single branch circuit and transmits this information to the main module 116. One circuit breaker 113, e.g., a two-pole circuit breaker, also measures and collects voltage data from each phase and transmits that data, using a wireless transceiver 115, to the main module 116. Alternatively, the voltage data can be measured and collected by multiple of the single-pole circuit breakers 112 with voltage measurement circuitry. In another alternative, the main module 116 can measure the voltage of the panel directly using a voltage measurement module 132 wired directly to the panel.

The main module 116 collects the wirelessly transmitted data from all the branch circuits and performs calculations to produce energy use data of interest to consumers and electricians monitoring individual branch circuits or the system 100. The circuit breakers 112 can also transmit other data, such as "tripped" or "near tripping" events and alarms. The circuit breakers 112 can also transmit data from advanced protection functions. Once the data from the circuit breakers 112 is retrieved by the main module 116, it can be processed, analyzed, and transmitted to a variety of other applications.

Figure 2:
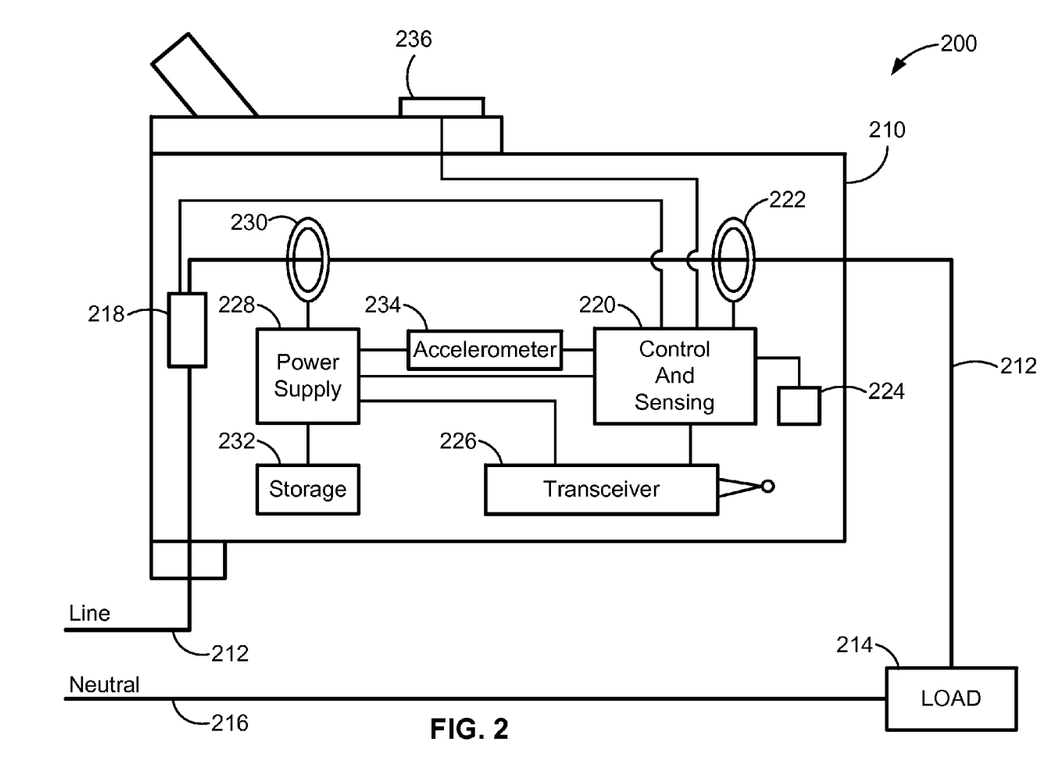
FIG. 2 is a block diagram of a circuit breaker in accordance with an aspect of the disclosure.

A block diagram of a wireless circuit breaker 200 is shown in FIG. 2. Circuit breaker 200 is shown as a single-phase circuit breaker, although the principles of the disclosure are also applicable to multi-phase circuit breakers. The circuit breaker 200 includes a housing 210 encasing the circuitry of the circuit breaker. The housing 210 can be a standard MCB package, allowing the circuit breaker 200 to serve as a drop-in replacement for an existing residential MCB in an installed base, for example. The circuit breaker 200 receives a line current over a branch circuit line conductor 212. The circuit breaker 200 is further coupled to a load 214 through the line conductor 212. The load 214 is also coupled to a neutral conductor 216. The voltage supplied to the load 214 from the line conductor 212 to the neutral conductor 216 is typically 120V or 240V. The circuit breaker 200 is not connected to the neutral conductor 216.

The circuit breaker 200 includes a trip circuit 218, which can include a trip solenoid that breaks the circuit by interrupting the current carried on the line conductor 212 when the current exceeds a threshold. Other standard overcurrent protection components (not shown) may be included in the circuit breaker 200. The circuit breaker 200 also includes a control and sensing circuit 220 that senses characteristics of the line current, for example the amount of current, the frequency of the current, etc. The control and sensing circuit 220 is coupled to the trip circuit 218 and can send the trip circuit 218 instructions to trip and break the line current conductor 212. The control and sensing circuit 220 includes a current sensing device such as a current transformer 222, which can be a coil that encircles the line conductor 212 inside the housing 210 and generates a current proportional to the line current in the line current conductor 212. Alternatively, the current sensing device can be a resistive shunt, a Hall Effect sensor, or other devices that sense characteristics of the current on the line current conductor 212. The control and sensing circuit 220 also includes a central processing unit (CPU), controller, or processor. The CPU of the control and sensing circuit 220 can execute a program of stored instructions for one or more aspects of the methods and systems as described herein. These instructions can be stored in a memory 224, such as a random access memory (RAM) or a read only memory (ROM). The memory 224 can be integrated with the CPU or a separate module. The control and sensing circuit 220 can record the sensed characteristics of the line current over a period of time (e.g., one second, one minute, etc.) and store it in the memory 224.

The circuit breaker 200 also includes a transceiver 226 for transmitting information from the circuit breaker 200 to the main module 116. The transceiver 226 can transmit information over radio frequencies using any of a number of protocols, such as wi-fi, Bluetooth, Zigbee, etc. The control and sensing circuit 220 and the transceiver 226 can be configured to transmit to the main module 116 the information about the sensed characteristics stored in the memory on a regular basis (e.g., every second, every minute, etc.) or upon a certain event (e.g., the circuit breaker tripping). For example, the control and sensing circuit 220 can sample the current transformer 222 output at a sampling rate and the transceiver 226 can periodically send the sampled state information about the current flowing through the branch circuit associated with the circuit breaker 200 to the main module 116, which can record that information over time, associate the measured current information with the voltage associated with that branch, and provide an electrician or consumer with information about energy usage on that line.

The circuit breaker 200 also includes a power supply 228 for supplying power to the components of the circuit breaker 200. For example, the power supply 228 is coupled to the control and sensing circuit 220 and the transceiver 226 to supply power to those components. Since this type of circuit breaker package normally will not have a neutral connection, power for the control and sensing circuit 220 and transceiver 226 is supplied by the load current using a current transformer 230 placed around the load current conductor 212 inside the circuit breaker 200. Thus, the power supply 228 can be configured to harvest power inductively from the line current rather than from a separate line to neutral connection. Alternatively, the current transformer 222 used for the sensing may also be coupled to the power supply 228 for generating an inductive current to power the circuit breaker 200. Because the power supply 228 generates power directly from current induced by the line current, there is no need for an additional line-to-neutral connection to the circuit breaker 200. Accordingly, the circuit breaker 200 can serve as a drop-in replacement for existing circuit breakers of the same form factor, with no special wiring or installation required.

When the circuit breaker trips (e.g., the trip circuit 218 trips and breaks the line current conductor 212), the power supply 228 can no longer draw power from the line current conductor 212. In order to provide power for circuit breaker operation after a trip, the circuit breaker 200 includes an energy storage device 232 coupled to the power supply 228. The energy storage device can be a capacitor that is charged by the power supply 228 during periods when the power supply 228 is generating power from the line current conductor 212. Alternatively, the energy storage device 232 can be a battery. A capacitor may be smaller and more cost-effective than a battery, while a battery may be able to provide power for a longer period after a trip.

Because the energy storage device 232 can provide power to the power supply 228 after a tripping event, the circuit breaker 200 can use this power to transmit information to the main module 116 upon or after a tripping event. For example, when the circuit breaker 200 trips, the control and sensing circuit 220 can retrieve the most current information about the line current from the memory 224 and cause the transceiver 226 to transmit that information to the main module 116. That information can include the existence of the trip and state information (e.g., the characteristics of the current just prior to the trip, including the magnitude and frequency of the current for the measured period of time). This information can be used by the main module 116 to help understand why the branch circuit associated with the circuit breaker 200 tripped.

The circuit breaker 200 can also include an accelerometer 234 configured to detect a tripping event. When the trip circuit 218 trips, it releases mechanical energy that jolts the circuit breaker 200. The accelerometer 234 can detect the movement related to the release of mechanical energy and send a signal to the control and circuit 220 indicating the trip. The control and sensing circuit 220 can use the signal from the accelerometer 234 as an indication of when it should initiate a transmission of trip and state information to the main module.

The circuit breaker 200 also includes a user interface 236 coupled to the control and sensing circuit 220. The user interface 236 includes for example, an LED display that displays an indication that the branch circuit current is near or above a threshold, such as a handle rating. The user interface can also include buttons that activate features of the circuit breaker, for example "push-to-test" functionality to verify that the circuit breaker 200 is working properly and/or a button to force the transmission of information to the main module 116.

Figure 3:
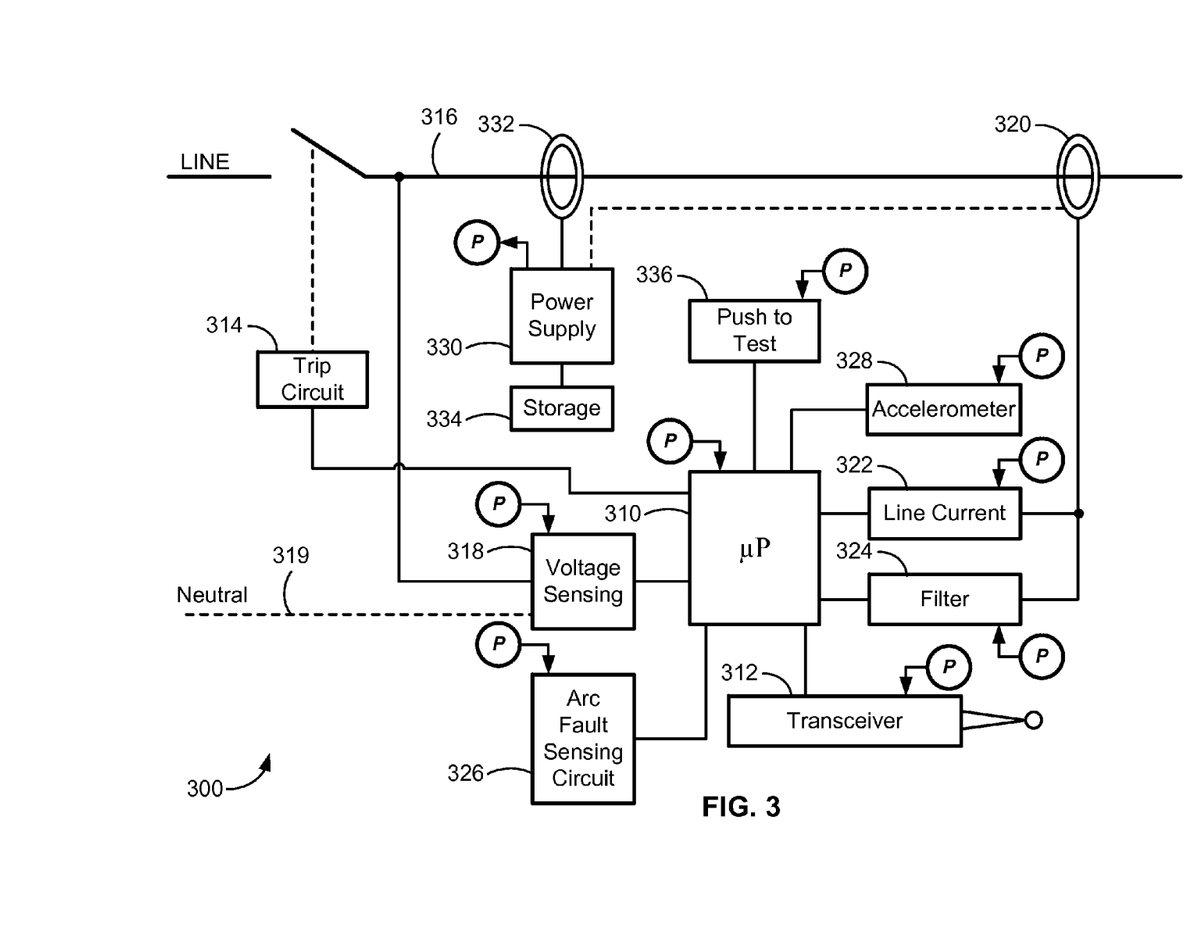
FIG. 3 is a block diagram of a different circuit breaker than FIG. 2.

FIG. 3 is a block diagram of another wireless circuit breaker 300. The circuit breaker 300 includes a CPU or microprocessor 310 and a transceiver 312 for transmitting information from the CPU 310 to the main module 116. The CPU 310 includes a memory for storing instructions executed by the CPU 310 and for storing data collected by the CPU 310 for transmission. The circuit breaker 300 includes a trip circuit 314 coupled to the CPU 310 and to a line current conductor 316 carrying current for the branch circuit associated with the circuit breaker 300. The trip circuit 314 can include, for example, a trip solenoid and other circuitry such as a capacitor to store energy for tripping the trip solenoid.

The circuit breaker 300 includes electronics for sensing and measuring a variety of characteristics of the power carried on the line current conductor 316. For example, the circuit breaker 300 can include a voltage measurement module 318 for measuring the voltage of the power on the line current conductor 316. In order to measure the voltage, the circuit breaker 300 accepts a neutral connection 319 to measure the line-to-neutral voltage. If the circuit breaker 300 does not need to measure voltage, the neutral connection 319 and voltage measurement module 318 can be omitted.

The circuit breaker 300 includes a current transformer 320 configured to generate an inductive current from the current carried on the line current conductor 316. The current transformer 320 is coupled to a line current module 322 that conditions the line current to be received by an ADC port of the CPU 310. The CPU 310 measures the signal received from the line current module 322 to determine a magnitude of the line current on line current conductor 316. The current transformer 320 is also coupled to a plurality of filters 324, which can be analog filters. The filters 324 can, for example, allow certain frequencies to pass through to ADC ports of the CPU 310. By monitoring these ports, the CPU can identify frequencies of the line current on the line current conductor 316 that indicate fault conditions. The CPU 310 can also measure and record the frequencies for analysis.

The circuit breaker 300 also includes an arc fault sensing circuit 326 that senses dangerous arc fault conditions. The arc fault sensing circuit 326 is coupled to the CPU 310 and is configured to send to the CPU 310 an arc fault signal upon detection of an arc fault. Upon receipt of the arc fault signal, the CPU 310 can cause the trip circuit 314 to break the circuit. The CPU 310 can also store an indication of the arc fault and the state of the line current. The CPU 310 can also cause the transceiver 312 to transmit the indication and the state information to the main module 116. The circuit breaker 300 can also include an accelerometer 328 coupled to the CPU 310 for detecting a release of mechanical energy from the trip circuit 314 when it breaks the circuit as explained above.

A power supply 330 supplies power to the components of the circuit breaker 300, including the CPU 310, the transceiver 312, the voltage measurement module 318, the line current module 322, the filters 324, the ground fault sensing circuit 326, and the accelerometer 328. The power supply 330 includes a current transformer 332 for generating inductive current from the line current conductor 316. Alternatively, the power supply 330 can be coupled to the current transformer 320, which can supply an induced current. When a single current transformer is used both to supply power and to supply a representation of the line current for measurement, space within the circuit breaker 300 can be conserved. The power supply 330 can also be coupled to an energy storage device 334, such as a capacitor or a battery. The energy storage device 334 can supply power to the circuit breaker components after the circuit is broken, for example to transmit trip and state information to the main module 116. The circuit breaker 300 can also include circuitry for other functionality, such as push-to-test circuitry 336 coupled to the CPU 310 and further coupled to a user interface (not shown).

Figure 4:
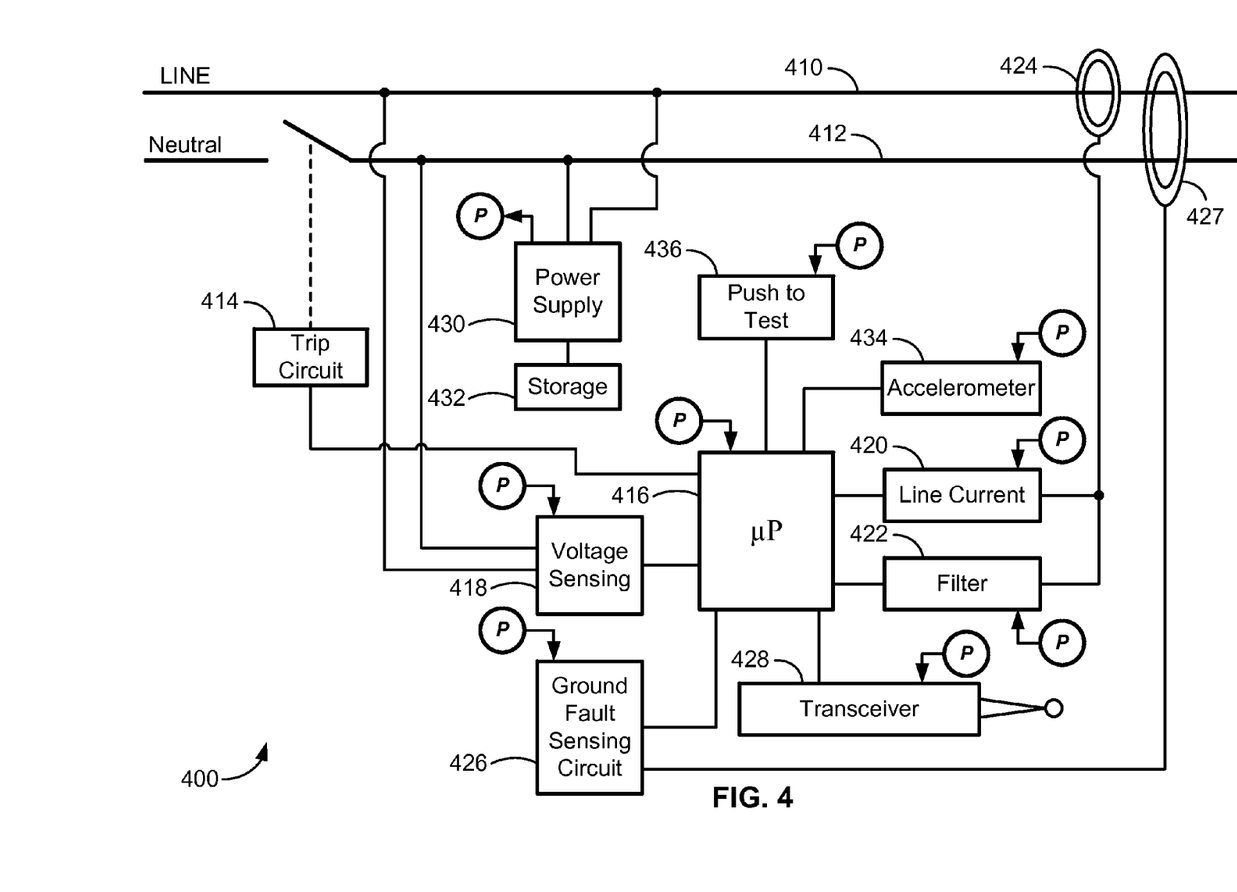
FIG. 4 is a block diagram of a different circuit breaker than FIGS. 2 and 3.

A block diagram of another circuit breaker 400 is shown in FIG. 4. The circuit breaker 400 is connected to both a line current conductor 410 and a neutral conductor 412. A trip circuit 414, which may include a trip solenoid and a capacitor, is shown breaking the neutral conductor 412, although it could also break the line current conductor 410. The trip circuit 414 is coupled to a CPU 416, which receives input from sensing circuitry and instructs the trip circuit 414 to trip upon a sensed fault condition. For example, the sensing circuitry can include a voltage sensing module 418, which includes circuitry for comparing the voltage on the line current conductor 410 and the neutral conductor 412 and sending a signal representing that voltage to an ADC port of the CPU 416. The sensing circuitry can also include a line current module 420 and a set of filters 422 for sending to the CPU 416 signals indicating the magnitude and the frequency of the line current, respectively. The line current module 420 and the filters 422 are coupled to a current transformer 424 that generates an inductive current representative of the current flowing through the line current conductor 410. The circuit breaker 400 includes a transceiver 428 coupled to the CPU 416 for transmitting data from the CPU 416 to the main module 116.

The circuit breaker 400 also includes a ground fault sensing circuit 426 that senses an imbalance in the current between the line current conductor 410 and the neutral conductor 412. The ground fault sensing circuit 426 is coupled to the CPU 416 and is configured to send to the CPU 416 a ground fault signal upon detection of a ground fault. For example, the ground fault sensing circuit 426 can be coupled to a differential current transformer 427 that senses a difference in the currents between the line current conductor 410 and the neutral conductor 412. If, for example, the line current conductor 410 is shunted to ground, the differential current sensed by the differential current transformer 427 will increase. The ground fault sensing circuit 426 detects this increase in differential current and communicates it to the CPU 416. Upon receipt of the ground fault signal, the CPU 416 can cause the trip circuit 414 to break the neutral conductor 412. The CPU 416 can also store an indication of the ground fault and the state of the line current. The CPU 416 can also cause the transceiver 428 to transmit the indication and the state information to the main module 116. The circuit breaker 400 can also include an accelerometer 434 coupled to the CPU 416 for detecting a release of mechanical energy from the trip circuit 414 when it breaks the circuit.

The circuit breaker components are power by a power supply 430. In this embodiment, the power supply 430 draws electrical power directly from the line current conductor 410 and the neutral conductor 412. The power supply 430 can also be coupled to an energy storage device 432, such as a capacitor or a battery. The energy storage device 432 can supply power to the circuit breaker components after the circuit is broken, for example to transmit trip and state information to the main module 116.

The circuit breaker 400 can also include circuitry for other functionality, such as push-to-test circuitry 436 coupled to the CPU 416 and further coupled to a user interface (not shown).

With further reference to FIG. 1, the main module 116 receives from the circuit breakers 112 the magnitude of the current flowing in each branch circuit and any alarms, such as tripping events. The main module 116 can estimate the power in each branch circuit based on the magnitude of the voltage (sensed by the voltage monitoring module 132 of the main module 116 or received from the circuit breaker 113) and the magnitude of the branch current (sensed at each branch circuit by the circuit breakers 112). The CPU 130 of the main module 116 can computer from this data RMS voltage, RMS current, and estimated real power for each branch and for the system as a whole. The CPU 130 can also generate alarms for circuit breakers that have tripped and can predict faults, for example by detecting near thermal trip conditions from the collected data. The CPU 130 can also store a history of the data it receives and computes. This data can be stored in a memory 134 in the main module 116, which can be memory included with the CPU 130 or a separate memory module. For example, the CPU 130 can store electrical power demand history for the system as a whole and for each individual branch circuit. The CPU 130 can also store in the memory 134 a history of tripping events and near-tripping events for each of the branch circuits.

When the circuit breakers 112 are equipped with more sophisticated measurement circuitry, such as circuitry to measure the frequency of the current, detect arc faults, and detect ground faults, the main module 116 can compute more advanced information from the data received wirelessly from the circuit breakers 112. The CPU 130 can execute more complex algorithms to compute more accurate measurements of real power, for example by determining the phase angle between the voltage and current (voltage sensed by main module 116 and current sensed by the branch circuit breakers 112). The circuit breakers 112 can time stamp current samples relative to the time of transmission to the main module 116 (using the circuit breaker CPUs described above). The main module 116 can then reverse the relative time in its recorded voltage samples to decode the phase angle information. The information computed by the CPU 130 can include RMS voltage, RMS current, real power, reactive power, current data (waveform data), and ground fault signal data. Additionally, the line voltage phase can be matched with a specific circuit breaker current measurement, allowing the system to be automatically configurable so that, for example, the CPU 130 knows which phase a single-pole breaker is attached to. The CPU 130 can also generate power factor alarms for near trip thermal trip conditions and alarms indicating that specific circuit breakers have tripped. The CPU 130 can store this data in the memory 134.

The main module 116 makes the data it collects and computes available to external devices through a network gateway 120 in the main module 116 coupled to the CPU 130. This provides a way for a customer, system manager, electrician, or customer service entity to conveniently view data from the main module 116, even from an off-site location. For example, the gateway 120 can send information from the main module 116 to a web page 126, a smart phone or tablet application 128, or a dedicated display 124. The gateway 120 interfaces with a network 122, which can be any of a local area network (LAN), wide area network (WAN), an Intranet, and/or the Internet. The gateway 120 includes the protocols necessary for communicating with the additional components across the network 122. The local display 124 can either be coupled directly to the main module 116 or through the gateway 120 and the network 122.

The information from the main module 116 can be used by a consumer or customer to remotely monitor his or her electrical usage while away from home. For example, if the branch circuit powering the customer's refrigerator and freezer trips while the customer is on vacation, food may spoil and the appliance may become damaged. Likewise, if the branch circuit powering the customer's hot tub trips during the winter, the water in the tub could freeze, damaging the tub. The customer can monitor the energy usage on those particular branch circuits remotely by logging into the webpage 126 or through the application 128 on his or her smartphone. The main module 116 can also send alerts (to the smartphone application 128, by email, by text message, etc.) when those branch circuits experience a trip or a near trip condition.

When the branch circuit breakers 112 contain circuitry for advanced protection functions, such as ground fault and arc fault protection, more detailed information can be received by the main module 116 and communicated to a remote location for diagnostic trouble shooting. For example, the circuit breakers 112 can transmit to the main module 116 the branch current waveform that caused the last trip event. An electrician, either reading information displayed on the dedicated display 124 or viewing the information through the webpage 126 or smartphone application 128, can detect problems on a particular branch circuit, such as a loose neutral, which can degrade the performance of or damage an appliance connected to that branch. An appliance manufacturer can also use information collected by the main module 116 to assess the health of an appliance connected to a branch circuit. For example, the main module 116 can record the characteristics of electrical usage on the appliance's branch and effectively learn the "signature" of the appliance's electrical use. The main module 116 can detect when the electrical usage on that branch changes and can alert the consumer or appliance manufacturer of potential damage to the appliance. The information collected and processed by the main module 116 can also be used to track the energy usage on particular branch circuits to help a consumer understand where he or she is using electricity and how the consumer could reduce energy usage and save money.

The advantages of a main energy monitoring module and its ability to process and distribute branch circuit data can be realized without installing an entirely new panel. Instead, wireless circuit breakers in accordance with this disclosure can be installed in place of existing traditional circuit breakers in an existing panel with little or no additional equipment or labor. The additional wireless functionality is included in the same package as the existing circuit breakers. Thus the wireless circuit breakers can serve as direct replacements for the existing traditional circuit breakers, without the need for additional wiring. This saves space within the panel. It also allows for retrofitting wireless circuit breakers without replacing the entire panel and also permits a staged approach to replacing breakers, where selective branch circuits can be retrofitted with wireless circuit breakers while others continue to use existing circuit breakers.

Housing the additional radio, power, and sensing components within the circuit breaker package itself provides protection for those components, eliminating the need for the additional hardware that would be necessary if those components were installed in the panel outside of the circuit breakers. By harvesting energy to power the wireless circuit breaker directly from the line current conductor, through a current transformer, space can be saved within the circuit breaker package and the need for an additional connection to the circuit breaker can be eliminated.

Because the wireless circuit breakers store energy for a period of time after a trip occurs, valuable information about the trip, including the state of the branch circuit current prior trip, can be saved and transmitted to the main module for analysis. The main module can then determine not only that a trip occurred, but also why the trip occurred. The main module can also distribute this information directly to the customer, technician, or electrician through the Internet or to a smartphone.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A circuit breaker comprising:
    sensing circuitry configured to sense a characteristic of a line current; a controller coupled to the sensing circuitry;
    a wireless transmitter coupled to the controller;
    a power supply comprising a first current transformer configured to generate an inductive current from the line current and provide power to the controller and the wireless transmitter; and
    an energy storage element coupled to the power supply, wherein the energy storage element is configured to store energy during periods when the power supply is generating power and to supply power to the wireless transmitter upon an interruption of the line current;
    wherein the controller is configured cause the wireless transmitter to transmit the sensed characteristic from the circuit breaker to a main energy monitoring module.

2. The circuit breaker of claim 1, further comprising:
    a housing, wherein the sensing circuitry, controller, wireless transmitter, and power supply are housed within the housing.

3. The circuit breaker of claim 2, wherein the housing is a miniature circuit breaker housing.

4. The circuit breaker of claim 1, wherein the characteristic of the line current is a fault condition.

5. The circuit breaker of claim 4, wherein the controller is further configured to transmit to the main energy monitoring module state information about the line current prior to the sensed fault condition.

6. The circuit breaker of claim 1, further comprising:
    a trip circuit configured to interrupt the line current;
    wherein the sensing circuitry comprises an accelerometer, the accelerometer configured to detect a trip event of the trip circuit; and
    wherein the wireless transmitter is configured to transmit information about the trip event to the main energy monitoring module upon the accelerometer detecting the trip event of the trip circuit.

7. The circuit breaker of claim 1, wherein the inductive current generated by the first current transformer is proportional to the line current and wherein the sensing circuitry senses the inductive current generated by the first current transformer.

8. A circuit breaker comprising:
    sensing circuitry configured to sense a characteristic of a line current;
    a controller coupled to the sensing circuitry;
    a wireless transmitter;
    a power supply; and
    a power storage element coupled to the power supply configured to supply power to the wireless transmitter after a loss of the line current, wherein the power storage element is configured to store energy during periods when the power supply is generating power and to supply power to the wireless transmitter upon an interruption of the line current;
    wherein the controller is configured to cause the wireless transmitter to transmit data about the characteristic to a main energy monitoring module after the loss of the line current.

9. The circuit breaker of claim 8, wherein the power storage element is a capacitor or a battery.

10. The circuit breaker of claim 8, wherein the sensing circuitry comprises an arc fault detector or a ground fault detector.

11. The circuit breaker of claim 8, further comprising:
a memory configured to store a state of the circuit breaker;
wherein the characteristic of the line current is a fault condition and the data about the characteristic transmitted by the wireless transmitter is the state of the circuit breaker stored in the memory prior to the fault.

12. The circuit breaker of claim 8, further comprising a current transformer configured to generate an inductive current from the line current and supply the inductive current to power the circuit breaker.

13. The circuit breaker of claim 12, wherein the current transformer is configured to supply the inductive current to the power storage element to charge the power storage element.

14. The circuit breaker of claim 8, wherein the sensing circuitry comprises an accelerometer.

15. The circuit breaker of claim 8, further comprising a miniature circuit breaker housing, wherein the sensing circuitry, the controller, the wireless transmitter, the power supply, and the power storage element are housed in the housing.

16. A system comprising:
a line current conductor;
a circuit breaker coupled to the line current conductor configured to monitor the line current conductor and trip upon a fault condition, the circuit breaker including:
sensing circuitry configured to sense a characteristic of the a line current in the line current conductor;
a controller coupled to the sensing circuitry;
a power supply comprising a first current transformer configured to generate an inductive current from the line current; and
a wireless transmitter; and
an energy storage element coupled to the power supply, wherein the energy storage element is configured to store energy during periods when the power supply is generating power and to supply power to the wireless transmitter upon an interruption of the line current; and
a main energy monitoring module comprising a wireless receiver;
wherein the wireless receiver of the main module is configured to receive data about the sensed characteristic transmitted from the wireless transmitter of the circuit breaker.

17. The system of claim 16, wherein the main energy monitoring module further comprises a gateway configured to communicate the data received from the circuit breaker to a remote application.

18. The system of claim 16, wherein the fault sensing circuitry comprises an accelerometer.

* * * * *